United States Patent
Mido et al.

(10) Patent No.: US 7,646,385 B2
(45) Date of Patent: Jan. 12, 2010

(54) COMPUTER GRAPHICS RENDERING METHOD AND APPARATUS

(75) Inventors: Shigeaki Mido, Kanagawa (JP); Satoshi Shigenaga, Kyoto (JP)

(73) Assignee: Panasonic Corporation, Osaka (JP)

( * ) Notice: Subject to any disclaimer, the term of this patent is extended or adjusted under 35 U.S.C. 154(b) by 573 days.

(21) Appl. No.: 11/480,477

(22) Filed: Jul. 5, 2006

(65) Prior Publication Data

US 2007/0008316 A1 Jan. 11, 2007

(30) Foreign Application Priority Data

Jul. 5, 2005 (JP) ............................. 2005-196560

(51) Int. Cl.
*G06T 15/40* (2006.01)
(52) U.S. Cl. ..................................... 345/422
(58) Field of Classification Search ........................ None
See application file for complete search history.

(56) References Cited

U.S. PATENT DOCUMENTS

| | | | | |
|---|---|---|---|---|
| 5,870,097 A * | 2/1999 | Snyder et al. | ............... | 345/426 |
| 5,936,628 A | 8/1999 | Kitamura et al. | | |
| 6,310,620 B1 * | 10/2001 | Lauer et al. | .................. | 345/424 |
| 6,362,818 B1 * | 3/2002 | Gardiner et al. | ............. | 345/421 |
| 6,525,726 B1 * | 2/2003 | Xie et al. | ..................... | 345/421 |
| 6,542,154 B1 * | 4/2003 | Knittel | ........................ | 345/427 |
| 2004/0080512 A1 * | 4/2004 | McCormack et al. | ....... | 345/543 |
| 2005/0062994 A1 | 3/2005 | Shiraishi | | |
| 2005/0219304 A1 * | 10/2005 | Ueda | ............................ | 347/19 |

FOREIGN PATENT DOCUMENTS

JP 2001-167291 6/2001

OTHER PUBLICATIONS

Pantazopoulos, I., Tzafestas, S., Occlusion Culling Algorithms: A Comprehensive Survey, Oct. 2002, Journal of Intelligent and Robotic Systems, vol. 35, No. 2, pp. 123-156.*
Segal, M., et al. "The OpenGL® Graphics System: A Specification (Version 1.5)" Silicon Graphics, Inc. Oct. 30, 2003, pp. 88-89.

* cited by examiner

*Primary Examiner*—Ulka Chuahan
*Assistant Examiner*—Said Broome
(74) *Attorney, Agent, or Firm*—McDermott Will & Emery LLP (57) ABSTRACT

When a plurality of coplanar shapes are rendered over one another by performing a hidden surface removal operation using the Z value, a reference plane is specified, and the Z value of each point of a shape to be rendered on the reference plane is uniquely calculated based on the Z value of the rendering start point, the Z value gradient dZdx for the X direction, and the Z value gradient dZdy for the Y direction. Thus, any coplanar shapes will have the same Z value for each point shared therebetween. Therefore, if the rendering process is performed under such a rule that a shape is overwritten when the Z value of the new shape is less than or equal to the current Z value, it is ensured that the previously-rendered shape is always overwritten with a later-rendered, coplanar shape. Thus, it is possible to prevent a phenomenon that some pixels of a later-rendered shape that are supposed to be displayed are not displayed.

22 Claims, 4 Drawing Sheets

FIG. 8
PRIOR ART

COMPUTER GRAPHICS RENDERING METHOD AND APPARATUS

CROSS REFERENCE TO RELATED APPLICATIONS

This Non-provisional application claims priority under 35 U.S.C. §119(a) on Patent Application No. 2005-196560 filed in Japan on Jul. 5, 2005, the entire contents of which are hereby incorporated by reference.

BACKGROUND OF THE INVENTION

The present invention relates to a computer graphics rendering method and apparatus.

Computer graphics rendering has been used widely in video games, car navigation systems, etc. In a video game, it is desirable that an object to be rendered, such as a human character, a car and a background object, is rendered beautifully in a realistic manner. In a car navigation system, it is desirable that an object to be rendered, such as a road, a building and a geographical feature, is rendered so that the rendered image is readily understood by the user. In order for the rendered image to be more realistic or more readily understandable, it is desirable that each object is rendered precisely at its intended position.

In order to display a three-dimensional (3D) image, it is necessary to perform hidden surface removal based on a point of view so as to render visible portions of a shape and not to render invisible portions thereof. The Z-buffer method is a conventional method for hidden surface removal. In the z-buffer method, a Z buffer is provided for storing the "Z value" representing the depth of each pixel on the display screen.

The Z value is also defined for each pixel of a shape to be rendered. Then, the Z value of each pixel of the shape being rendered is compared with that of the same pixel in the Z buffer, and pixel data with a smaller Z value (i.e., pixel data closer to the viewer) is displayed. The hidden surface removal operation is performed as described above.

A conventional line segment rendering method will now be described. The DDA (Digital Differential Analyzer) method is commonly used as a method for rendering a line segment.

Figure 6:
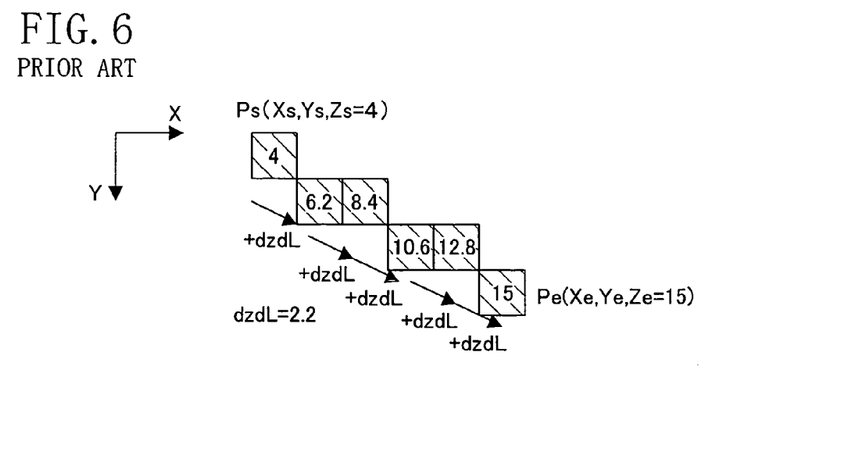
FIG. 6 shows an example of a line segment rendered by a conventional rendering method.

Referring to FIG. 6, where the start point position Ps of a line segment is (Xs, Ys, Zs) and the end point position Pe thereof is (Xe, Ye, Ze), the process will be referred to as "DDA in the X direction" if $|Xe-Xs| \geq |Ye-Ys|$ and as "DDA in the Y direction" if $|Xe-Xs| < |Ye-Ys|$.

In the DDA in the X direction, the gradients $dYdX=(Ye-Ys)/|Xe-Xs|$ and $dZdX=(Ze-Zs)/|Xe-Xs|$ are calculated assuming $L=|Xe-Xs|$, and the next point P1 to be rendered after the start point Ps is calculated by $P1=(X1,Y1,Z1)=(Xs+|Xe-Xs|/(Xe-Xs), Ys+dYdX, Zs+dZdX)$. Thereafter, the next point Pj to be rendered after the current point Pi is calculated by $Pj=(Xj, Yj, Zj)=(Xi+|Xe-Xs|/(Xe-Xs), Yi+dYdX, Zi+dZdX)$, and the process is repeated until the X coordinate Xj is equal to Xe.

In the DDA in the Y direction, the gradients $dXdY=(Xe-Xs)/|Ye-Ys|$ and $dZdY=(Ze-Zs)/|Ye-Ys|$ are calculated assuming $L=|Ye-Ys|$, and the next point P1 to be rendered after the start point Ps is calculated by $P1=(X1,Y1,Z1)=(Xs+dXdY, Ys+|Ye-Ys|/(Ye-Ys), Zs+dZdY)$. Thereafter, the next point Pj to be rendered after the current point Pi is calculated by $Pj=(Xj, Yj, Zj)=(Xi+dXdY, Yi+|Ye-Ys|/(Ye-Ys), Zi+dZdY)$, and the process is repeated until the Y coordinate Yj is equal to Ye. In FIG. 6, the value in each box represents the calculated Z value of that point.

A DDA method described below is commonly used as a method for rendering a trapezoid, including a rectangular or a triangle as a variation thereof.

Figure 7:
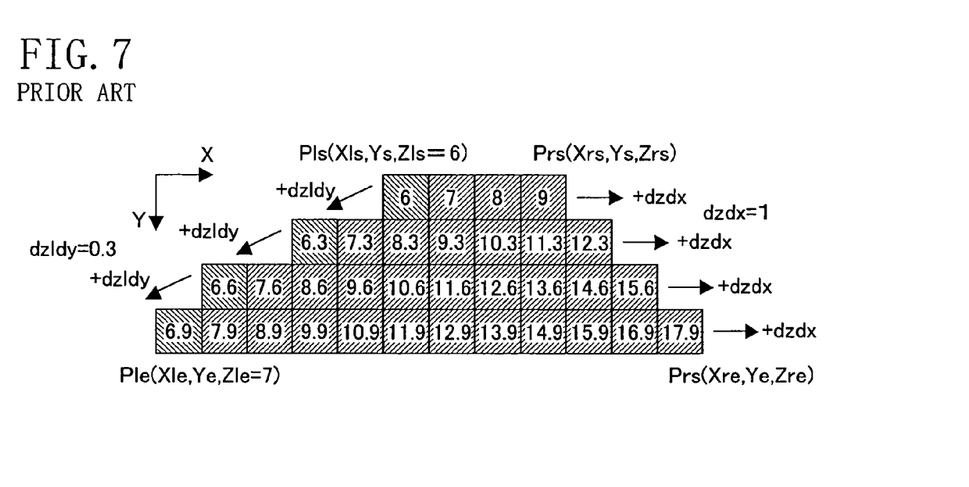
FIG. 7 shows an example of a trapezoid rendered by the conventional rendering method.

Referring to FIG. 7, where a trapezoid has the left-side start point position Pls =(Xls, Ys, Zls), the right-side start point position Prs=(Xrs, Ys, Zrs), the left-side end point position Ple=(Xle, Ye, Zle) and the right-side end point position Pre=(Xre, Ye, Zre), the gradients $dXldY=(Xle-Xls)/|Ye-Ys|$, $dXrdY=(Xre-Xrs)/|Ye-Ys|$, $dZldY=(Zle-Zls)/|Ye-Ys|$ and $dZdX=(Zrs-Zls)/(Xrs-Xls)$ are calculated in the DDA method. First, the horizontal portion where Y=Ys is rendered. Assume the leftmost point of this portion is Pl(Xl, Y, Zl) and the rightmost point thereof is (Xr, Y, Zr). First, assuming Xl=Xls, Xr=Xrs, Y=Ys and Zl=Zls, the leftmost point is rendered. The next point P1 to be rendered is calculated by $P1=(X, Y, Z)=(Xls+1, Ys, Zls+dZdX)$. Thereafter, the next point Pj to be rendered after the current point Pi is calculated by $Pj=(Xj, Yj)=(Xi+1, Ys, Zi+dZdX)$, and the process is repeated until the X coordinate Xj is equal to Xr. Then, Y is incremented by 1, and the process proceeds to the next portion below. Where the leftmost point is Pl(Xl, Y, Zl), it is assumed Xl=Xl+dXldY, Y=Y+1, Z=Zl+dZldY and Xr=Xr+dXrdY, and the process of adding 1 and dZdX in the X direction as described above is repeated until the X coordinate reaches the rightmost value Xr. This series of operations are repeated until Y is equal to Ye. Thus, a quadrilateral is rendered. In FIG. 7, the value in each box represents the calculated Z value of that point.

Figure 8:
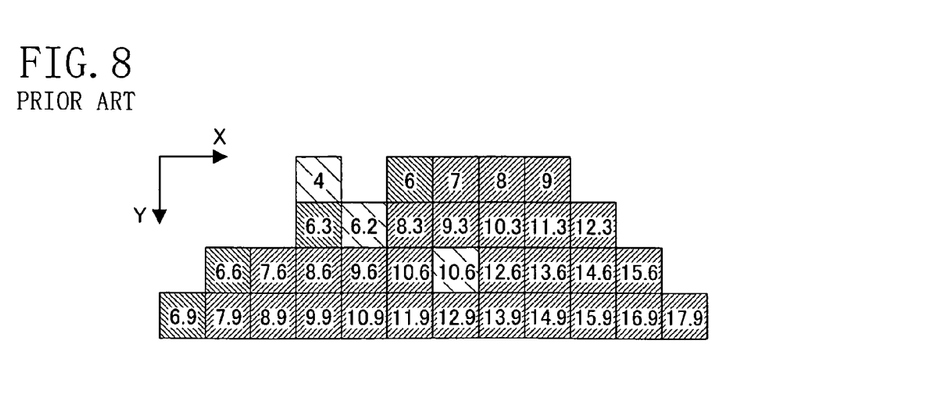
FIG. 8 shows an example of the line segment rendered over the trapezoid using the conventional rendering method.

However, a problem arises when rendering a line over a coplanar rendered quadrilateral with the conventional rendering method as described above with hidden surface removal with reference to Z values, the Z value of one point along the line as calculated when rendering the line may differ from that of the same point as calculated when rendering the quadrilateral, even though the line segment and the quadrilateral are coplanar with each other. Then, in many cases, the line is inappropriately rendered over the quadrilateral. For example, under a rule where a new Z value of a point replaces the previous Z value of that point if the new Z value is less than or equal to the previous Z value, rendering the line of FIG. 6 over the trapezoid of FIG. 7 yields a result as shown in FIG. 8, indicating that the line is not appropriately rendered over the trapezoid.

Where two coplanar shapes share some pixels with each other, the two shapes should theoretically share the same Z value for each of those pixels. However, the calculated Z value for one shape may differ from that for the other shape. Then, some pixels of one shape that are supposed to be displayed may not be displayed.

In view of this, Japanese Laid-Open Patent Publication No. 2001-167291, for example, discloses a method in which a constant offset Z value is added to, or subtracted from, the Z value of each pixel of one of two coplanar shapes that is intended to be rendered closer to the viewer than the other shape.

However, this method also has a problem in that the two shapes may not be rendered properly as to which is rendered over the other, depending on the magnitude relationship between the constant offset Z value and the Z values calculated while rendering a line segment and a quadrilateral.

SUMMARY OF THE INVENTION

The present invention is based on the realization of the problems in the prior art as described above. That is, in the conventional rendering method, the DDA method for a line segment and that for a quadrilateral are different rendering algorithms, and the Z value errors are caused by this difference between the rendering algorithms. Not only does the difference between the rendering algorithms result in Z value errors when drawing one shape over another, but it also results in non-uniform color gradations between two coplanar shapes where the color of each shape is gradually changed for a stereoscopic effect.

It is an object of the present invention to provide a computer graphics rendering method and apparatus capable of performing the Z value calculation in the z-buffer method, the calculation of the color value between different shapes in a case where the colors of a plurality of shapes on the same plane are gradually changed for a stereoscopic effect, and the like, in such a manner that it is possible to render an object in a precise manner and in a realistic and readily understandable manner.

In order to achieve the object set forth above, the present invention employs a single uniform calculation algorithm for the Z value calculation, the color value calculation, and the like.

Specifically, a method of the present invention is a computer graphics rendering method for two-dimensionally rendering two or more overlapping three-dimensional shapes on the same plane by using a computer, the method including the steps of: specifying, for two or more shapes to be rendered, a single plane including these shapes as a reference plane; uniquely determining, for each point of the two or more shapes included in the reference plane, a Z value of a three-dimensional coordinate system based on an X-direction parameter and a Y-direction parameter of the three-dimensional coordinate system, and storing the determined Z value in a Z buffer; and performing a hidden surface removal operation for an overlapping portion between the two or more shapes by using the Z values stored in the Z buffer.

In one embodiment of the computer graphics rendering method, where a shape to be rendered is a line segment, the Z value of a rendering start point of the line segment, a Z value gradient for the X direction as the X-direction parameter and a Z value gradient for the Y direction as the Y-direction parameter are obtained, and the Z value of each point in the line segment is uniquely determined based on the Z value and the Z value gradients for the X direction and the Y direction.

In one embodiment of the computer graphics rendering method, where a shape to be rendered is a trapezoid, including a rectangular or a triangle as a variation thereof, the Z value of a rendering start point of the trapezoid, a Z value gradient for the X direction as the X-direction parameter and a Z value gradient for the Y direction as the Y-direction parameter are obtained, and the Z value of each point in the trapezoid is uniquely determined based on the Z value and the Z value gradients for the X direction and the Y direction.

Another method of the present invention is a computer graphics rendering method for two-dimensionally rendering, on the same plane, two or more shapes by using a computer, the method including the steps of: specifying, for two or more shapes to be rendered, a single plane including these shapes as a reference plane; and uniquely determining, for each point of the two or more shapes included in the reference plane, a transparency or color value based on an X-direction parameter and a Y-direction parameter of a two-dimensional coordinate system.

In one embodiment of the computer graphics rendering method, where a shape to be rendered is a line segment, the transparency or color value of a rendering start point of the line segment, an amount of change in transparency or color for the X direction as the X-direction parameter and an amount of change in transparency or color for the Y direction as the Y-direction parameter are obtained; and the transparency or color value of each point in the line segment is uniquely determined based on the transparency or color value and the amounts of change in transparency or color for the X direction and the Y direction.

In one embodiment of the computer graphics rendering method, where a shape to be rendered is a trapezoid, including a rectangular or a triangle as a variation thereof, the transparency or color value of a rendering start point of the trapezoid, an amount of change in transparency or color for the X direction as the X-direction parameter and an amount of change in transparency or color for the Y direction as the Y-direction parameter are obtained; and the transparency or color value of each point in the trapezoid is uniquely determined based on the transparency or color value and the amounts of change in transparency or color for the X direction and the Y direction.

In one embodiment of the computer graphics rendering method, where the Z value gradient for the X direction is equal to that for the Y direction or an amount of change in transparency or color for the X direction is equal to that for the Y direction, if an offset of an integer portion of an X coordinate to a current point being rendered and an offset of an integer portion of a Y coordinate to the current point being rendered are both +1 or both −1, a value obtained by left-shifting the Z value gradient or the amount of change in transparency or color for the X direction or the Y direction by one bit is added to, or subtracted from, the Z value or the transparency or color value of a previously-rendered point.

In one embodiment of the computer graphics rendering method, where the Z value gradient for the X direction is equal to that for the Y direction or an amount of change in transparency or color for the X direction is equal to that for the Y direction, if an offset of an integer portion of an X coordinate to a current point being rendered is +1 while an offset of an integer portion of a Y coordinate to the current point being rendered is −1 or if the offset of the integer portion of the X coordinate to the current point being rendered is −1 while the offset of the integer portion of the Y coordinate to the current point being rendered is +1, addition and subtraction of the Z value gradient or the amount of change in transparency or color for the X direction and the Y direction are canceled.

In one embodiment of the computer graphics rendering method, for each of a plurality of vertex arrays each including three or more vertices specifying one plane, all vertices of the vertex array share the same value as a plane number parameter; and by specifying a plane number, it is possible to simultaneously specify a plurality of vertices having the plane number, thereby simultaneously specifying a plurality of reference planes.

An apparatus of the present invention is a computer graphics rendering apparatus for two-dimensionally rendering two or more overlapping three-dimensional shapes on the same plane by using a computer, the apparatus including: a control section for specifying, as a reference plane, a plane including two or more shapes to be rendered; a DDA section for uniquely determining, for each point of the two or more shapes included in the reference plane, a Z value of a three-dimensional coordinate system based on an X-direction parameter and a Y-direction parameter of the three-dimensional coordinate system, and storing the determined Z value in a Z buffer; and a rendering output section for performing a hidden surface removal operation for an overlapping portion between the two or more shapes by using the Z values stored in the Z buffer.

In one embodiment of the computer graphics rendering apparatus, where a shape to be rendered is a line segment, the DDA section receives the Z value of a rendering start point of the line segment, a Z value gradient for the X direction as the X-direction parameter and a Z value gradient for the Y direction as the Y-direction parameter, and the DDA section uniquely determines the Z value of each point in the line segment based on the Z value and the Z value gradients for the X direction and the Y direction.

In one embodiment of the computer graphics rendering apparatus, where a shape to be rendered is a trapezoid, including a rectangular or a triangle as a variation thereof, the DDA section receives the Z value of a rendering start point of the trapezoid, a Z value gradient for the X direction as the X-direction parameter and a Z value gradient for the Y direction as the Y-direction parameter, and the DDA section uniquely determines the Z value of each point in the trapezoid based on the Z value and the Z value gradients for the X direction and the Y direction.

Another apparatus of the present invention is a computer graphics rendering apparatus for two-dimensionally rendering two or more shapes on the same plane by using a computer, the apparatus including: a control section for specifying, for two or more shapes to be rendered, a single plane including these shapes as a reference plane; and a DDA section for uniquely determining, for each point of the two or more shapes included in the reference plane, a transparency or color value based on an X-direction parameter and a Y-direction parameter of a two-dimensional position.

In one embodiment of the computer graphics rendering apparatus, where a shape to be rendered is a line segment, the DDA section receives the transparency or color value of a rendering start point of the line segment, an amount of change in transparency or color for the X direction as the X-direction parameter and an amount of change in transparency or color for the Y direction as the Y-direction parameter; and the DDA section uniquely determines the transparency or color value of each point in the line segment based on the transparency or color value and the amounts of change in transparency or color for the X direction and the Y direction.

In one embodiment of the computer graphics rendering apparatus, where a shape to be rendered is a trapezoid, including a rectangular or a triangle as a variation thereof, the DDA section receives the transparency or color value of a rendering start point of the trapezoid, an amount of change in transparency or color for the X direction as the X-direction parameter and an amount of change in transparency or color for the Y direction as the Y-direction parameter; and the DDA section uniquely determines the transparency or color value of each point in the trapezoid based on the transparency or color value and the amounts of change in transparency or color for the X direction and the Y direction.

In one embodiment of the computer graphics rendering apparatus, where the Z value gradient for the X direction is equal to that for the Y direction or an amount of change in transparency or color for the X direction is equal to that for the Y direction, if an offset of an integer portion of an X coordinate to a current point being rendered and an offset of an integer portion of a Y coordinate to the current point being rendered are both +1 or both −1, a value obtained by left-shifting the Z value gradient or the amount of change in transparency or color for the X direction or the Y direction by one bit is added to, or subtracted from, the Z value or the transparency or color value of a previously-rendered point by the DDA section.

In one embodiment of the computer graphics rendering apparatus, where the Z value gradient for the X direction is equal to that for the Y direction or an amount of change in transparency or color for the X direction is equal to that for the Y direction, if an offset of an integer portion of an X coordinate to a current point being rendered is +1 while an offset of an integer portion of a Y coordinate to the current point being rendered is −1 or if the offset of the integer portion of the X coordinate to the current point being rendered is −1 while the offset of the integer portion of the Y coordinate to the current point being rendered is +1, the DDA section cancels addition and subtraction of the Z value gradient or the amount of change in transparency or color for the X direction and the Y direction.

In one embodiment of the computer graphics rendering apparatus, for each of a plurality of vertex arrays each including three or more vertices defining one plane, all vertices of the vertex array share the same value as a plane number parameter; and by specifying a plane number, the control section simultaneously specifies a plurality of vertices having the plane number, thereby simultaneously specifying a plurality of reference planes.

Thus, in the present invention, any shape is rendered with respect to a reference plane using a uniform set of parameters for the reference plane. For example, in a case where a hidden surface removal operation is performed by using the Z value based on the z-buffer method, the process specifies a plane as the reference plane, and calculates the Z value of a reference point on the reference plane, the gradient of the Z value in the X direction and that in the Y direction. Then, any shape is rendered by using the three Z value-related parameters obtained based on the reference plane. As a result, different coplanar shapes will have the same Z value at the same point. Therefore, it is possible to realize accurate overwriting.

Where an operation such as "fogging" is performed by setting a transparency value in each point of a shape for a stereoscopic effect, the process specifies a plane as the reference plane, and calculates the transparency value of a reference point on the reference plane, the gradient of the transparency value in the X direction and that in the Y direction. Then, any shape is rendered by using the three transparency value-related parameters obtained based on the reference plane. As a result, different shapes can be rendered with a uniform change in transparency between those shapes. Where it is not necessary that the transparency value is uniform across the reference plane and it is only desired to make uniform how transparency changes, the process may be done without using the transparency value of the reference point.

Where the color is gradually changed across a reference plane for a stereoscopic effect, the process specifies a plane as the reference plane, and calculates the amount of change in color in the X direction and that in the Y direction based on the reference plane. Then, any shape is rendered by using the two color-related parameters obtained based on the reference plane. As a result, different shapes can be rendered with a uniform change in color between those shapes.

DETAILED DESCRIPTION OF THE INVENTION

Computer graphics rendering apparatuses and methods according to embodiments of the present invention will now be described with reference to the accompanying drawings.

FIRST EMBODIMENT

Figure 1:
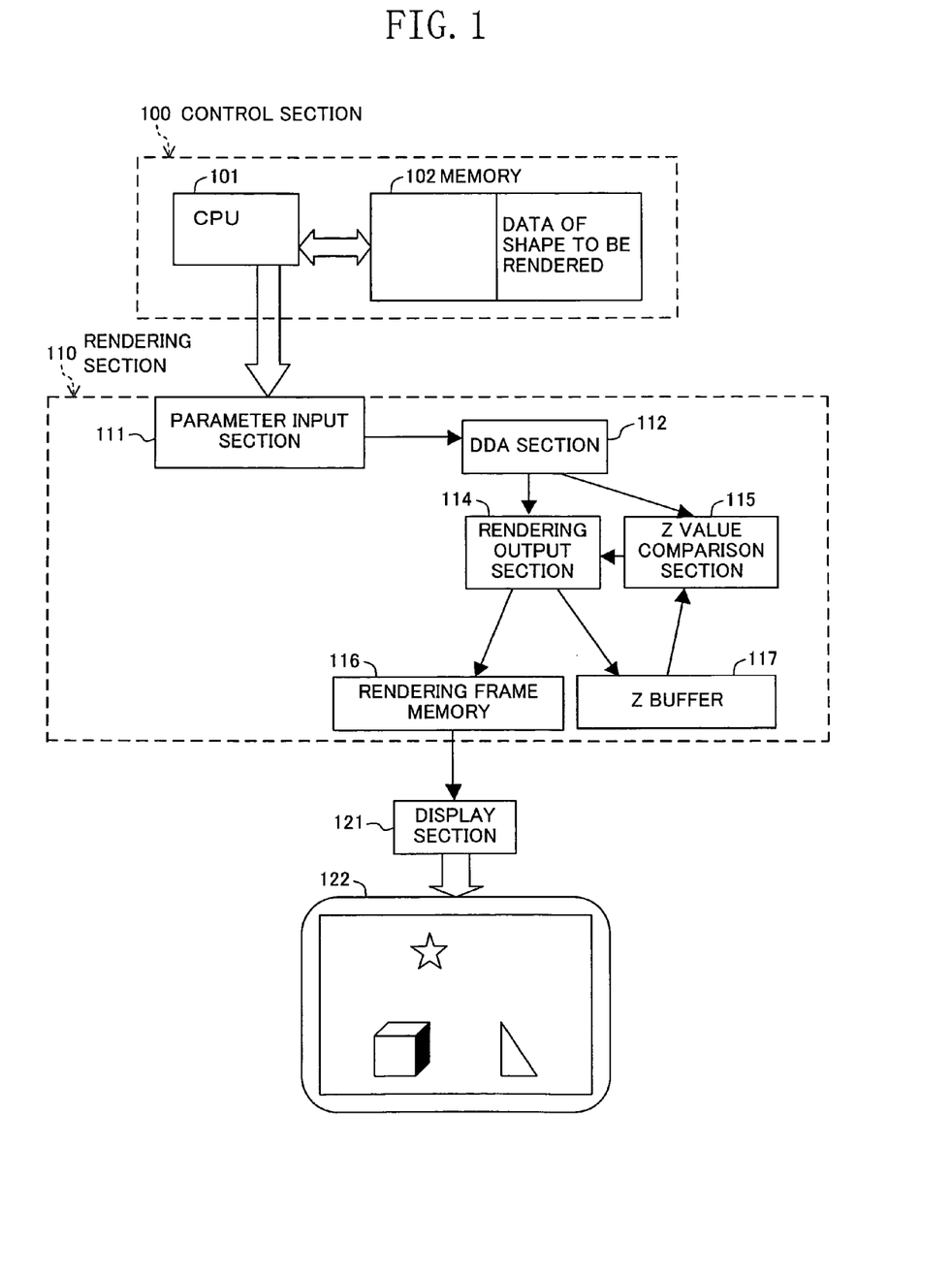
FIG. 1 is a block diagram showing a rendering apparatus according to a first embodiment of the present invention.

FIG. 1 shows a general configuration of a computer graphics rendering apparatus of the present invention.

Figure 2:
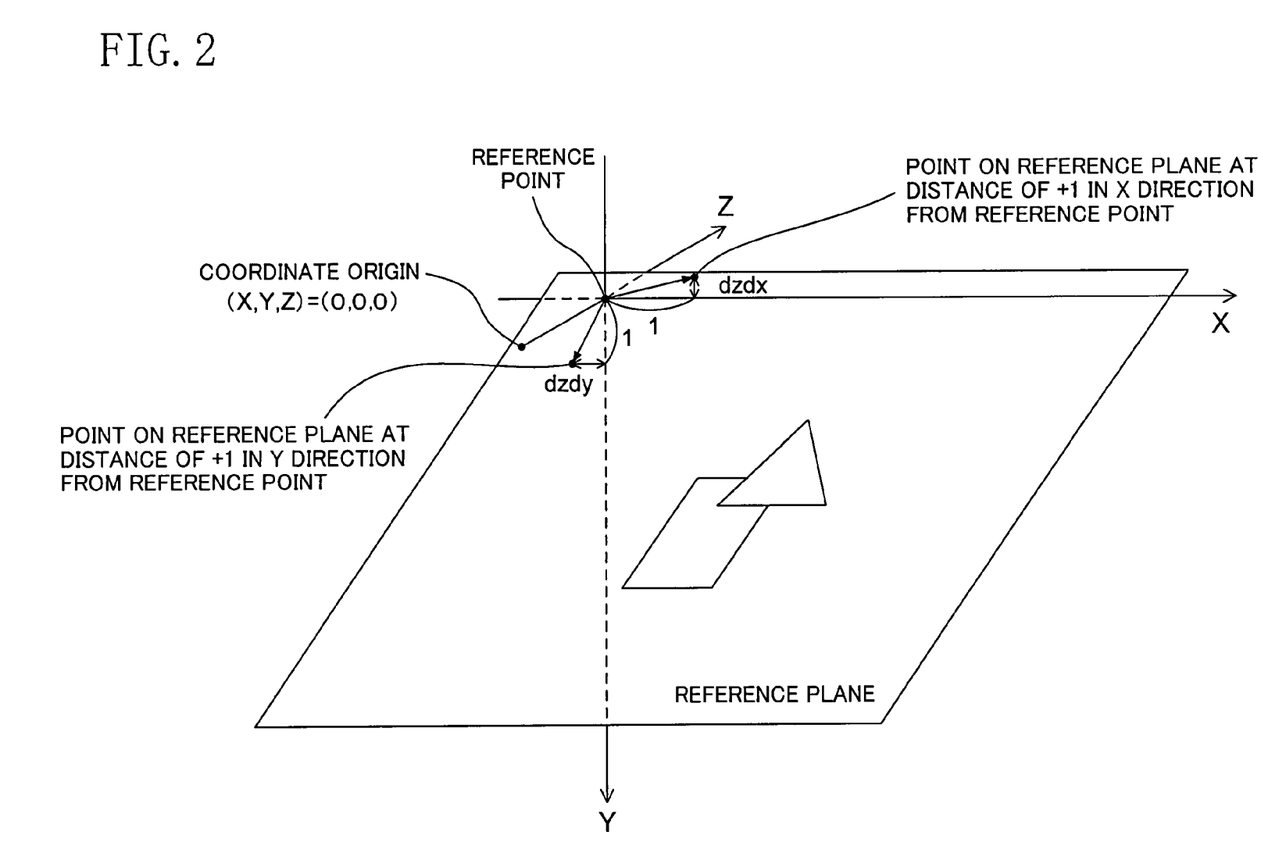
FIG. 2 shows a reference plane used in the rendering process by the rendering apparatus.

Referring to data of shapes to be rendered stored in a memory 102, a CPU 101 of a control section 100 specifies a reference plane including the shapes based on the shape data, and calculates, as parameters, the Z value Zstart of a predetermined reference point on the specified reference plane, the amount dZdX by which the Z value changes for a +1 move in the X direction on the reference plane, and the amount dZdY by which the Z value changes for a +1 move in the Y direction. The calculated parameters are input to a parameter input section 111 of a rendering section 110.

Where the point $(X, Y)=(0, 0)$ is defined as the reference point on the reference plane, for example, the reference point is the intersection between the Z axis and the reference plane as shown in FIG. 2. The following description is based on this assumption.

The reference plane may be specified as a polygon having three or more vertices (where all the vertices are coplanar), or as a plane across which the X value, the Y value or the Z value has a predetermined constant value. Alternatively, such a plane may be subjected to a coordinate transformation to obtain the reference plane.

Next, a DDA section 112 in the rendering section 110 calculates the X, Y and Z values of each point. With any shape being rendered, the Z value of each point is always calculated from the following expression:

$$Z=Zstart+dZdX\times(\text{integer portion of }X)+dZdY\times(\text{integer portion of }Y).$$

Where the above expression is used, it is necessary to perform two multiplications and two additions for rendering each point of a shape. If the increase in computational cost results in problems such as a decrease in the rendering speed and an increase in the power consumption, the calculation of the Z value using the expression can be replaced by the following process.

When a line or a trapezoid (including a rectangular or a triangle as a variation thereof) is rendered, the Z value of each point can be calculated by a DDA method as follows. This allows for a reduction in the computational cost for the Z value calculation, thereby realizing an increase in the rendering speed and a decrease in the power consumption.

Figure 3:
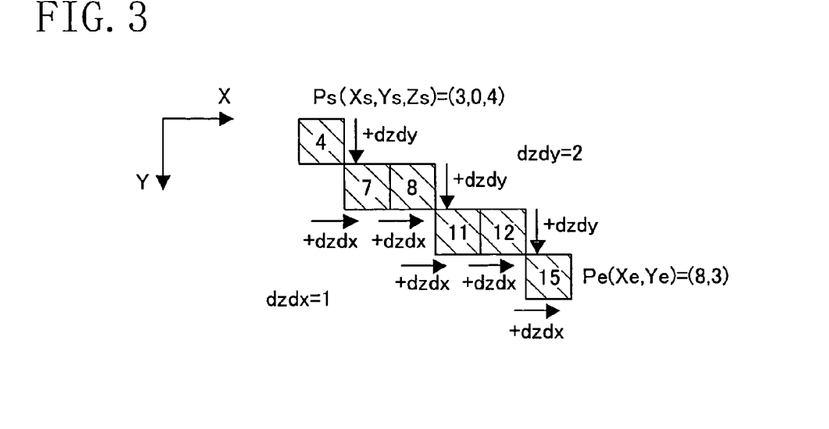
FIG. 3 shows an example of a line segment rendered by the rendering apparatus.

Referring to FIG. 3, a method for rendering a line at a high speed by using the DDA method of the present embodiment will be described. The start point position Ps of a line segment is (Xs, Ys), and the end point position Pe thereof is (Xe, Ye). First, the Z value Zs of the start point of the line segment is calculated using the expression above.

$$Zs=Zstart+dZdX\times(\text{integer portion of }Xs)+dZdY\times(\text{integer portion of }Ys)$$

The process will be referred to as "DDA in the X direction" if $|Xe-Xs|\geq|Ye-Ys|$ and as "DDA in the Y direction" if $|Xe-Xs|<|Ye-Ys|$.

In the DDA in the X direction, the gradient $dYdX=(Ye-Ys)/|Xe-Xs|$ is first calculated. Thereafter, the next point Pj to be rendered after the current point Pi is calculated by the following expression:

$$Pj=(Xj, Yj)=(Xi+|Xe-Xs|/(Xe-Xs), Yi+dYdX).$$

The Z value Zj of the point Pj is obtained by adding dZdX to Zi when the integer portion of X increases by 1, and by subtracting dZdX from Zi when the integer portion of X decreases by 1. Moreover, dZdY is added to Zj when the integer portion of Y increases by 1, and dZdY is subtracted from Zj when the integer portion of Y decreases by 1. The obtained Z value is Zj. A Z value comparison section 115 of FIG. 1 compares the calculated Z value with the Z value of the same point (the same X and Y coordinates) on a Z buffer 117. If a predetermined rendering condition is met, a rendering output section 114 writes data of the rendered point in a rendering frame memory 116 and updates the Z value on the Z buffer 117. These operations are repeated until the X coordinate Xj is equal to Xe.

In the DDA in the Y direction, the gradient $dXdY=(Xe-Xs)/|Ye-Ys|$ is first calculated. Thereafter, the next point Pj to be rendered after Pi is calculated by the following expression:

$$Pj=(Xj,Yj)=(Xi+dXdY,Yi+|Ye-Ys|/(Ye-Ys)).$$

The Z value Zj of the point Pj is obtained by adding dZdX to Zi when the integer portion of X increases by 1, and by subtracting dZdX from Zi when the integer portion of X decreases by 1. Moreover, dZdY is added to Zj when the integer portion of Y increases by 1, and dZdY is subtracted from Zj when the integer portion of Y decreases by 1. The obtained value is Zj. The Z value comparison section 115 compares the calculated Z value with the Z value of the same point (the same X and Y coordinates) on the Z buffer 117. If a predetermined rendering condition is met, the rendering output section 114 writes data of the rendered point in the rendering frame memory 116 and updates the Z value on the Z buffer 117. These operations are repeated until the Y coordinate Yj is equal to Ye.

FIG. 3 shows the Z values of rendered points calculated as described above. The value in each box represents the calculated Z value of that point where Zstart=1, dZdX=1 and dZdY=2. The Z value of the upper left start point Ps can be calculated by the expression above to be Zstart+dZdX×3+ dZdY×0=1+1×3+2 ×0=4. Since the offset to the next point to be rendered is +1 both in the X direction and in the Y direction, the Z value of this point is Zi+dZdX+dZdY=4+1+2=7. Since the offset to the point to be rendered after the next is +1 only in the X direction, the Z value of this point is Zi+dZdX=7+1=8. This operation as described above is repeated until the end point Pe=(8, 3) of the line segment is reached, thereby obtaining the Z value calculation results as shown in FIG. 3.

Where dZdX=dZdY, when the integer portion of X and the integer portion of Y both increase or decrease by 1, the calculation can be done simply by adding or subtracting a value obtained by left-shifting dZdX(=dZdY) by one bit, thereby reducing the number of addition/subtraction operations by 1. Moreover, where the integer portion of X increases by 1 while the integer portion of Y decreases by 1, or where the integer portion of X decreases by 1 while the integer portion of Y increases by 1, the addition and subtraction of dZdX and dZdY can be canceled out by each other, thereby reducing the number of addition/subtraction operations by 2, allowing for an even faster operation.

Figure 4:
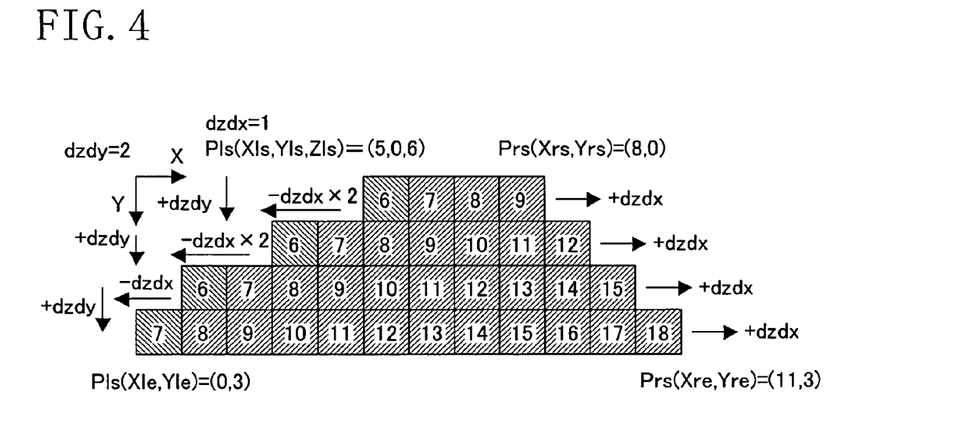
FIG. 4 shows an example of a trapezoid rendered by the rendering apparatus.

Referring now to FIG. 4, a method for rendering a trapezoid at a high speed by using the DDA method of the present embodiment will be described.

The left-side start point position Pls of the trapezoid is (Xls, Yls), the right-side start point position Prs is (Xrs, Yls), the left-side end point position Ple is (Xle, Ye), and the right-side end point position Pre is (Xre, Ye). First, the Z value Zls of the left-side start point Pls (the upper left vertex of the trapezoid) is calculated using the following expression:

$$Zls=Zstart+dZdX\times(\text{integer portion of } Xls)+dZdY\times(\text{integer portion of } Yls).$$

Then, the gradients dXldY=(Xle−Xls)/(Ye−Ys) and dXrdY=(Xre−Xrs)/(Ye−Ys) are calculated. First, the horizontal portion where Y=Ys is rendered. Assume the leftmost point of this portion is Pli(Xli, Yi, Zli) and the rightmost point thereof is (Xri, Yi). First, assume Xli=Xls, Xri=Xrs, Yi=Ys and Zli=Zls. Thereafter, the next point Pj to be rendered after the current point Pi is calculated as follows:

$$Pj=(Xj,Yj,Zj)=(Xi+1,Y,Zi+dZdX).$$

The Z value comparison section 115 of FIG. 1 compares the calculated Z value with the Z value of the same point (the same X and Y coordinates) on the Z buffer 117. If a predetermined rendering condition is met, the rendering output section 114 writes data of the rendered point in the rendering frame memory 116 and updates the Z value on the Z buffer 117. These operations are repeated until the X coordinate Xj is equal to Xr.

Then, Y is incremented by 1, and the process proceeds to the next portion below. Where the new leftmost point is Plj (Xlj, Yj, Zlj), it is assumed Xlj=Xli+dXldY, Yj=Yi+1 and Xrj=Xri+dXrdY, and dZdY is added to Zli to obtain the Z value Zlj of the point Plj since the integer portion of Y has increased by 1. Then, if the integer portion of Xl increases by n, dZdX×n is further added to Zlj to obtain the new value of Zlj. If the integer portion of Xl decreases by n, dZdX×n is further subtracted from Zlj to obtain the new value of Zlj. Instead of these operations, Zlj can be obtained by using the above expression as follows:

$$Zlj=Zstart+dZdX\times(\text{integer portion of } Xlj)+dZdY\times(\text{integer portion of } Yj).$$

Thereafter, the addition of 1 to X and the addition of dZdX to Z are repeated as described above to repeatedly render points until the X value reaches the rightmost value Xrj. The series of operations are repeated until Y=Ye, thus rendering a trapezoid.

FIG. 4 shows the Z values of the rendered points calculated as described above. The value in each box represents the calculated Z value of that point where Zstart=1, dZdX=1 and dZdY=2. Referring to FIG. 4, the Z value of the start point Pls can be calculated by the expression above to be Zstart+dZdX×5+dZdY×0=1+1×5+2×0=6. Then, the process proceeds by +1 at a time in the X direction through a portion of the shape where the Y coordinate is 0 to the rightmost point, while obtaining the Z value by adding dZdX (=1) to the previous Z value each time. Thus, the rightmost point, which is at a distance of +3 in the X direction from the start point, has a Z value of 9. Then, Y is incremented by 1, and the process proceeds to the next portion below. The offset from the previous leftmost point to the leftmost point of the current portion where Y=1 is −2 in the X direction and +1 in the Y direciton. Thus, the Z value of this point is Zli+dZdX×(−2)+dZdY=6+1×(−2)+2=6. Then, the process proceeds by +1 at a time in the X direction through a portion of the shape where the Y coordinate is 1 to the rightmost point, while obtaining the Z value by adding dZdX (=1) to the previous Z value each time. Thus, the rightmost point, which is at a distance of +6 in the X direction from the start point, has a Z value of 12. This operation as described above is repeated until the end point of the bottom portion of the trapezoid (where Y=3) is reached, thereby obtaining the Z value calculation results as shown in FIG. 4.

As described above, if a line or a trapezoid is rendered by using the rendering method of the present embodiment, any coplanar shapes will have the same Z value for each point shared therebetween.

Figure 5:
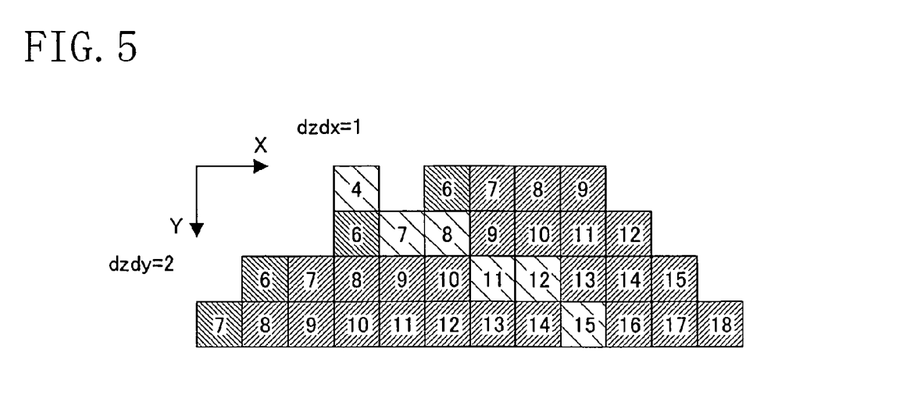
FIG. 5 shows an example where the line segment is rendered over the trapezoid using the rendering apparatus.

Therefore, if the hidden surface removal using the Z value is performed under such a rule that a shape is overwritten when the Z value of the new shape is less than or equal to the current Z value in the Z buffer 117 as compared by the Z value comparison section 115, it is ensured that the previously-rendered shape is always overwritten with a later-rendered, coplanar shape. For example, if the line of FIG. 3 is written over the previously-rendered trapezoid of FIG. 4, a rendered image as shown in FIG. 5 is obtained, indicating that the overwrite process is performed properly as intended. In FIG. 5, the lightly-hatched boxes represent the points rendered as a line drawn over the trapezoid, and the other, heavily-hatched boxes represent the points rendered as the trapezoid over which the line is drawn. The image rendered on the rendering frame memory 116 is read out by a display section 121 and displayed on a screen 122.

Next, a rendering process using the reference plane will be further discussed. There may be a case where a three-dimensional object is rendered by combining a plurality of shapes belonging to different reference planes with other two-dimensional shapes being rendered later on the surface of the three-dimensional object, and where only one reference plane can be used at the same time. In such a case, the process can be done by dividing the three-dimensional object into sections each belonging to one plane, and by repeating, for each plane, the operation of rendering a corresponding section of the three-dimensional object and rendering a corresponding portion of the two-dimensional shapes over the rendered section of the three-dimensional object. Thus, it is possible to render a three-dimensional object by the rendering method using the reference plane as described above. However, if a three-dimensional object is divided into shapes each belonging to one plane and a rendering command is issued for each shape, there is an increased computational cost, and it is desirable that the rendering operation can be done at once for each object.

In view of this, "plane number" can be used as an additional parameter of each vertex in vertex arrays specifying a series of triangles, wherein three or more vertices having the same plane number are regarded as being coplanar. Then, a plurality of reference planes can be specified in one rendering process. When instructing to render based on an already-specified reference plane, the number of vertices having the same plane number may be one or more. Where a vertex belongs to two or more reference planes, two or more plane numbers may be assigned to one vertex.

Then, it is not necessary to issue many rendering commands for one three-dimensional object for specifying reference planes, and it is possible, with a single rendering command, to render a three-dimensional object while successively specifying a plurality of reference planes and, with another single rendering command, to render two-dimensional shapes over the three-dimensional object while successively referring to a plurality of reference planes. With this method in which "plane number" is used as an additional parameter for vertices, two-dimensional shapes can be rendered over a three-dimensional object while skipping the process of dividing a three-dimensional object into sections each belonging to one plane. Therefore, it is possible to realize a fast and efficient overwrite process. Parameters for a reference plane that have once been calculated are preferably re-used when later rendering a shape on the same plane.

SECOND EMBODIMENT

A second embodiment of the present invention will now be described.

In the preceding embodiment, the Z value to be used for hidden surface removal when rendering a three-dimensional image is calculated based on the same algorithm irrespective of the type of a shape to be rendered. In the present embodiment, instead of the Z value as in the first embodiment, the transparency and the color of each point of a shape to be rendered are calculated based on the same algorithm irrespective of the type of a shape to be rendered, whereby there will be a uniform change in transparency and a uniform change in color among different shapes rendered, thus realizing a desirable stereoscopic effect.

In the present embodiment, instead of Zstart, dZdX and dZdY as in the first embodiment, the following values are first obtained: the transparency value $\alpha$start of a given reference point on a reference plane (it is assumed herein that the reference point is where $(X, Y)=(0, 0)$), the amount of change in transparency ($d\alpha dX$) for a +1 move in the X direction on the reference plane, the amount of change in color (dRdX, dGdX and dBdX) for a +1 move in the X direction on the reference plane, the amount of change in transparency ($d\alpha dY$) for a +1 move in the Y direction on the reference plane, and the amount of change (dRdY, dGdY and dBdY) in color for a +1 move in the Y direction on the reference plane.

Assume that the start point position Ps of a line segment is (Xs, Ys) and the end point position Pe thereof is (Xe, Ye). When rendering the line, the process first sets the transparency value as of the start point and the color values Rs, Gs and Bs of the start point each to a predetermined value, instead of setting the Z value Zs of the start point position as in the first embodiment. In order to make the transparency values of different points uniform, the transparency value as of the start point may be determined by the following expression, as in the calculation of the Z value Zs of the start point position in the first embodiment.

$\alpha s = \alpha\text{start} + d\alpha dX \times (\text{integer portion of } Xs) + d\alpha dY \times (\text{integer portion of } Ys)$ Thereafter, the line is rendered as described above in the first embodiment, except that the Z value and the gradients dZdX and dZdY thereof are replaced by the transparency $\alpha$ and the transparency and color gradients $d\alpha dX$, dRdX, dGdX, dBdX, $d\alpha dY$, dRdY, dGdY and dBdY.

Next, assume that the left-side start point position Pls of a trapezoid is (Xls, Ys), the right-side start point position Prs thereof is (Xrs, Ys), the left-side end point position Ple thereof is (Xle, Ye), and the right-side end point position Pre thereof is (Xre, Ye).

When rendering the trapezoid, the process first sets the transparency value $\alpha$ls or the color values Rls, Gls and Bls of the left-side start point position each to a predetermined value, instead of setting the Z value Zls of the left-side start point position as in the first embodiment. In order to make the transparency values of different points uniform, the transparency value $\alpha$ls of the start point may be determined by the following expression, as in the calculation of the Z value Zls of the left-side start point position in the first embodiment.

$\alpha ls = \alpha\text{start} + d\alpha dX \times (\text{integer portion of } Xls) + d\alpha dY \times (\text{integer portion of } Yls)$ Thereafter, the trapezoid is rendered as described above in the first embodiment, except that the Z value and the gradients dZdX and dZdY thereof are replaced by the transparency $\alpha$ and the transparency and color gradients $d\alpha dX$, dRdX, dGdX, dBdX, $d\alpha dY$, dRdY, dGdY and dBdY.

If line segments and trapezoids are rendered by such a method as described above, the transparency value or the amount of change in color or transparency can be made uniform among any ones of the shapes rendered as long as they are coplanar. Therefore, in a case where the color is changed gradually for a stereoscopic effect, it is possible to make the change in color uniform among different shapes.

What is claimed is:

1. A computer graphics rendering method for two-dimensional rendering two or more overlapping three-dimensional shapes on the same plane by using a computer, the method comprising the steps of:

specifying, for two or more shapes to be rendered, a single plane including these shapes as a reference plane;

uniquely determining, for each point of the two or more shapes included in the reference plane, a Z value of the three-dimensional coordinate system based on an X-direction parameter and a Y-direction parameter of the three-dimensional coordinate system;

comparing the determined Z value with a Z value stored in a Z buffer;

determining whether to update the Z value stored in the Z buffer based on a result of the comparing step;

performing via a computer, a hidden surface removal operation for an overlapping portion between the two or more shapes based on the result of the comparing step writing, in a frame memory, data associated with each point of the two or more shapes included in the reference plane, and rendering the two or more shapes;

wherein where a shape to be rendered is a line segment, the Z value of a rendering start point of the line segment, a Z value gradient for the Z direction as the Z-direction parameter and a Z value gradient for the Y direction as the Y-direction parameter are obtained, and the Z value of each point in the line segment is uniquely determined based on the Z value and the Z value gradients for the X direction and the Y direction; and wherein where the Z value gradient for the X direction is equal to that for the Y direction or an amount of change in transparency of color for the X direction is equal to that for the Y direction, if an offset of an integer portion of an X coordinate to a current point being rendered and an offset of an integer portion of a Y coordinate to the current point being rendered are both +1 or both −1, a value obtained by left-shifting the Z value gradient of the amount of change in transparency of color for the X direction of the Y direction by one bit is added to, or subtracted from, the Z value or the transparency or color value of a previously-rendered point.

2. The computer graphics rendering method of claim 1, wherein where a shape to be rendered is a trapezoid, including a rectangular or a triangle as a variation thereof, the Z value of a rendering start point of the trapezoid, a Z value gradient for the X direction as the X-direction parameter and a Z value gradient for the Y direction as the Y-direction parameter are obtained, and the Z value of each point in the trapezoid is uniquely determined based on the Z value and the Z value gradients for the X direction and the Y direction.

3. A computer graphics rendering method for two-dimensionally rendering, on the same plane, two or more shapes by using a computer, the method comprising the steps of: specifying, for two or more shapes to be rendered, a single plane including these shapes as a reference plane;
uniquely determining via a computer, for each point of the two or more shapes included in the reference plane, a transparency of color value based on an X-direction parameter and a Y-direction parameter of a two-dimensional coordinate system;
where a shape to be rendered is a line segment, the transparency of color value of a rendering start point of the line segment, an amount of change in transparency or color for the X direction as the X-direction parameter and an amount of change in transparency or color for the Y direction as the Y-direction parameter are obtained;
the transparency or color value of each point in the line segment id uniquely determined based on the transparency of color value and the amount of change in transparency of color for the X direction and the Y direction; and
wherein where a Z value gradient for the X direction is equal to that for the Y direction or the amount of change in transparency of color for the X direction is equal to that for the Y direction, if an offset of an integer portion of an X coordinate to a current point being rendered and an offset of an integer portion of a Y coordinate to the current point being rendered are both +1 or both −1, a value obtained by left-shifting the Z value gradient or the amount of change in transparency of color for the X direction of the Y direction by one bit is added to, or subtracted from, the Z value or the transparency of color value of a previously-rendered point.

4. The computer graphics rendering method of claim 2, wherein:
where a shape to be rendered is a trapezoid, including a rectangular of a triangle as a variation thereof, the transparency or color value of a rendering start point of the trapezoid, an amount of change in transparency of color for the X direction as the X-direction parameter and an amount of change in transparency of color for the Y direction as the Y-direction parameter are obtained; and
the transparency of color value of each point in the trapezoid is uniquely determined based on the transparency or color value and the amount of change in transparency of color for the X direction and the Y direction.

5. The computer graphics rendering method of claim 1, wherein where the Z value gradient for the X direction is equal to that for the Y direction or an amount of change in transparency or color for the X direction is equal to that for the Y direction, if an offset of an integer portion of an X coordinate to a current point being rendered is +1 while an offset of an integer portion of a Y coordinate to the current point being rendered is −1 or if the offset of the integer portion of the X coordinate to the current point being rendered is −1 while the offset of the integer portion of the Y coordinate to the current point being rendered is +1, addition and subtraction of the Z value gradient or the amount of change in transparency or color for the X direction and the Y direction are canceled.

6. The computer graphics rendering method of claim 2, wherein where the Z value gradient for the X direction is equal to that for the Y direction or the amount of change in transparency or color for the X direction is equal to that for the Y direction, if an offset of an integer portion of an X coordinate to a current point being rendered is +1 while an offset of an integer portion of a Y coordinate to the current point being rendered is −1 or if the offset of the integer portion of the X coordinate to the current point being rendered is −1 while the offset of the integer portion of the Y coordinate to the current point being rendered is +1, addition and subtraction of the Z value gradient or the amount of change in transparency or color for the X direction and the Y direction are canceled.

7. The computer graphics rendering method of claim 1, wherein:
for each of a plurality of vertex arrays each including three or more vertices specifying one plane, all vertices of the vertex array share the same value as a plane number parameter; and
by specifying a plane number, it is possible to simultaneously specify a plurality of vertices having the plane number, thereby simultaneously specifying a plurality of reference planes.

8. The computer graphics rendering method of claim 2, wherein:
for each of a plurality of vertex arrays each including three or more vertices defining one plane, all vertices of the vertex array share the same value as a plane number parameter; and
by specifying a plane number, it is possible to simultaneously specify a plurality of vertices having the plane number, thereby simultaneously specifying a plurality of reference planes.

9. A computer graphics rendering apparatus for two-dimensionally rendering two or more overlapping three-dimensional shapes on the same plane by using a computer, the apparatus comprising:
a control section for specifying, as a reference plane, a plane including two or more shapes to be rendered;
a DDA section for uniquely determining, for each point of the two or more shapes included in the reference plane, a Z value of a three-dimensional coordinate system based on an X-direction parameter and a Y-direction parameter of the three-dimensional coordinate system, and storing the determined Z value in a Z buffer;
a rendering output section for performing a hidden surface removal operation for an overlapping portion between the two or more shapes by using the Z values stored in the Z buffer;
wherein where a shape to be rendered is a line segment, the DDA section receives the Z value of a rendering start point of the line segment, a Z value gradient for the X direction as the X-direction parameter and a Z value gradient for the Y direction as the Y-direction parameter, and the DDA section uniquely determines the Z value of each point in the line segment based on the Z value and the Z value gradients for the X direction and the Y direction; and
wherein where the Z value gradient for the X direction is equal to that for the Y direction or an amount of change in transparency or color for the X direction is equal to that for the Y direction, if an offset of an integer portion of an X coordinate to a current point being rendered and an offset of an integer portion of a Y coordinate to the current point being rendered are both +1 or both −1, a value obtained by left-shifting the Z value gradient or the amount of change in transparency or color for the X direction or the Y direction by one bit is added to, or subtracted from, the Z value or the transparency or color value of a previously-rendered point by the DDA section.

10. The computer graphics rendering apparatus of claim 5, wherein where a shape to be rendered is a trapezoid, including a rectangular or a triangle as a variation thereof, the DDA section receives the Z value of a rendering start point of the trapezoid, a Z value gradient for the X direction as the X-direction parameter and a Z value gradient for the Y direction as the Y-direction parameter, and the DDA section uniquely determines the Z value of each point in the trapezoid based on the Z value and the Z value gradients for the X direction and the Y direction.

11. A computer graphics rendering apparatus for two-dimensionally rendering two or more shapes on the same plane by using a computer, the apparatus comprising:

a control section for specifying, for two or more shapes to be rendered, a single plane including these shapes as a reference plane;

a DDA section for uniquely determining, for each point of the two or more shapes included in the reference plane, a transparency of color value based on an X-direction parameter and a Y-direction parameter of a two-dimensional position;

where a shape to be rendered is a line segment, the DDA section receives the transparency or color value of a rendering start point of the line segment, an amount of change in transparency or color for the X direction as the X-direction parameter and an amount of change in transparency or color for the Y direction as the Y-direction parameter;

the DDA section uniquely determines the transparency or color value of each point in the line segment based on the transparency or color value and the amount of change in transparency or color for the X direction and the Y direction; and wherein where the Z value gradient for the X direction is equal to that for the Y direction or the amount of change in transparency or color for the X direction is equal to that for the Y direction, if an offset of an integer portion of an X coordinate to a current point being rendered and an offset of an integer portion of a Y coordinate to the current point being rendered are both +1 or both −1, a value obtained by left-shifting the Z value gradient or the amount of change in transparency of color for the X direction or the Y direction by one bit is added to, or subtracted from, the Z value or the transparency or color value of a previously-rendered point by the DDA section.

12. The computer graphics rendering apparatus of claim 7, wherein:

where a shape to be rendered is a trapezoid, including a rectangular or a triangle as a variation thereof, the DDA section receives the transparency or color value of a rendering start point of the trapezoid, an amount of change in transparency or color for the X direction as the X-direction parameter and an amount of change in transparency or color for the Y direction as the Y-direction parameter; and the DDA section uniquely determines the transparency or color value of each point in the trapezoid based on the transparency or color value and the amounts of change in transparency or color for the X direction and the Y direction.

13. The computer graphics rendering apparatus of claim 5, wherein where the Z value gradient for the X direction is equal to that for the Y direction or an amount of change in transparency or color for the X direction is equal to that for the Y direction, if an offset of an integer portion of an X coordinate to a current point being rendered is +1 while an offset of an integer portion of a Y coordinate to the current point being rendered is −1 or if the offset of the integer portion of the X coordinate to the current point being rendered is −1 while the offset of the integer portion of the Y coordinate to the current point being rendered is +1, the DDA section cancels addition and subtraction of the Z value gradient or the amount of change in transparency or color for the X direction and the Y direction.

14. The computer graphics rendering apparatus of claim 7, wherein where the Z value gradient for the X direction is equal to that for the Y direction or the amount of change in transparency or color for the X direction is equal to that for the Y direction, if an offset of an integer portion of an X coordinate to a current point being rendered is +1 while an offset of an integer portion of a Y coordinate to the current point being rendered is −1 or if the offset of the integer portion of the X coordinate to the current point being rendered is −1 while the offset of the integer portion of the Y coordinate to the current point being rendered is 1, the DDA section cancels addition and subtraction of the Z value gradient or the amount of change in transparency or color for the X direction and the Y direction.

15. The computer graphics rendering apparatus of claim 5, wherein:

for each of a plurality of vertex arrays each including three or more vertices defining one plane, all vertices of the vertex array share the same value as a plane number parameter; and by specifying a plane number, the control section simultaneously specifies a plurality of vertices having the plane number, thereby simultaneously specifying a plurality of reference planes.

16. The computer graphics rendering apparatus of claim 7, wherein:

for each of a plurality of vertex arrays each including three or more vertices defining one plane, all vertices of the vertex array share the same value as a plane number parameter; and by specifying a plane number, the control section simultaneously specifies a plurality of vertices having the plane number, thereby simultaneously specifying a plurality of reference planes.

17. The computer graphics rendering method of claim 1, wherein, for each point of the two or more shapes included in the reference plane, the Z value is determined using a single uniform calculation.

18. The computer graphics rendering method of claim 2, wherein, for each point of the two or more shapes included in the reference plane, the transparency or color value is determined using a single uniform calculation.

19. The computer graphics rendering apparatus of claim 5, wherein the DDA section determines, for each point of the two or more shapes included in the reference plane, the Z value using a single uniform calculation.

20. The computer graphics rendering apparatus of claim 7, wherein the DDA section determines, for each point of the two or more shapes included in the reference plane, the transparency or color value using a single uniform calculation.

21. The computer graphics rendering method of claim 1, wherein:

the X-direction parameter includes a Z value gradient in the X direction, the Y-direction parameter includes a Z value gradient in the Y direction, the Z value gradient in the X direction is the same for each point of the two or more shapes included in the reference plane, and the Z value gradient in the Y direction is the same for each point of the two or more shapes included in the reference plane.

22. The computer graphics rendering apparatus of claim 5, wherein:

the X-direction parameter includes a Z value gradient in the X direction, the Y-direction parameter includes a Z value gradient in the Y direction, the Z value gradient in the X direction is the same for each point of the two or more shapes included in the reference plane, and the Z value gradient in the Y direction is the same for each point of the two or more shapes included in the reference plane.

* * * * *